(12) United States Patent
Purri et al.

(10) Patent No.: US 9,734,278 B1
(45) Date of Patent: Aug. 15, 2017

(54) METHODS, SYSTEMS, AND ARTICLES OF MANUFACTURE FOR AUTOMATIC EXTRACTION OF CONNECTIVITY INFORMATION FOR IMPLEMENTATION OF ELECTRONIC DESIGNS

(71) Applicant: Cadence Design Systems, Inc., San Jose, CA (US)

(72) Inventors: Victor Markus Purri, Austin, TX (US); Guilherme Henrique de Sousa Santos, Belo Horizonte (BR); Chung-Wah Norris Ip, Cupertino, CA (US); Marcus Vincius da Mata Gomes, San Jose, CA (US)

(73) Assignee: Cadence Design System, Inc., San Jose, CA (US)

(*) Notice: Subject to any disclaimer, the term of this patent is extended or adjusted under 35 U.S.C. 154(b) by 31 days.

(21) Appl. No.: 14/754,630

(22) Filed: Jun. 29, 2015

(51) Int. Cl.
*G06F 17/50* (2006.01)

(52) U.S. Cl.
CPC ........ *G06F 17/5081* (2013.01); *G06F 17/504* (2013.01); *G06F 17/505* (2013.01); *G06F 17/5022* (2013.01)

(58) Field of Classification Search
CPC ............. G06F 17/5081; G06F 17/5022; G06F 17/504; G06F 17/505
USPC ........... 716/111, 105, 106, 132, 136; 703/16
See application file for complete search history.

(56) References Cited

U.S. PATENT DOCUMENTS

| | | | |
|---|---|---|---|
| 5,140,526 A * | 8/1992 | McDermith | G06F 17/505 705/28 |
| 5,623,420 A * | 4/1997 | Yee | G06F 17/5068 716/120 |
| 6,412,097 B1 * | 6/2002 | Kikuchi | G06F 17/5081 716/122 |
| 6,915,248 B1 | 7/2005 | Ip et al. | |
| 7,065,726 B1 | 6/2006 | Singhal et al. | |
| 7,159,198 B1 | 1/2007 | Ip et al. | |
| 7,237,208 B1 | 6/2007 | Ip et al. | |
| 7,421,668 B1 | 9/2008 | Ip et al. | |
| 7,437,694 B1 | 10/2008 | Loh et al. | |
| 7,506,288 B1 | 3/2009 | Ip et al. | |
| 7,584,443 B1 * | 9/2009 | Govig | G06F 17/5031 716/113 |

(Continued)

OTHER PUBLICATIONS

U.S. Appl. No. 14/754,331, filed Jun. 29, 2015 (not attached herewith).

*Primary Examiner* — Phallaka Kik
(74) *Attorney, Agent, or Firm* — Vista IP Law Group, LLP

(57) ABSTRACT

Disclosed are techniques for implementing electronic designs with automatic connectivity information extraction. These techniques traverse at least a portion of an electronic design, classify or categorize circuit component designs encountered during traversal into multiple categories, extract connectivity information for the at least the portion of the electronic design based in part or in whole upon one or more criteria, and devising the at least the portion of the electronic design with at least the connectivity information. A connectivity data structure may be constructed with the extracted connectivity information. A plurality of circuit component designs categorized into the same category may be grouped into a single element in the connectivity data structure.

26 Claims, 13 Drawing Sheets

(56) References Cited

U.S. PATENT DOCUMENTS

| | | | |
|---|---|---|---|
| 7,689,942 B2* | 3/2010 | Acar | G06F 17/5031 |
| | | | 716/134 |
| 7,761,836 B1* | 7/2010 | Wadland | G06F 17/5077 |
| | | | 716/130 |
| 7,770,142 B1* | 8/2010 | Shmayovitsh | G06F 17/5036 |
| | | | 716/109 |
| 7,870,523 B1* | 1/2011 | Uziel | G06F 11/263 |
| | | | 703/2 |
| 7,895,552 B1 | 2/2011 | Singhal et al. | |
| 8,205,187 B1 | 6/2012 | Coelho et al. | |
| 8,527,911 B1 | 9/2013 | Kranen et al. | |
| 8,621,411 B1* | 12/2013 | Ward | G06F 17/505 |
| | | | 716/118 |
| 8,630,824 B1 | 1/2014 | Ip et al. | |
| 8,683,419 B1* | 3/2014 | Hines | G06F 17/505 |
| | | | 716/109 |
| 8,731,894 B1 | 5/2014 | Kranen et al. | |
| 8,762,898 B1* | 6/2014 | Maziasz | G06F 17/5077 |
| | | | 716/50 |
| 8,831,925 B1 | 9/2014 | Kranen et al. | |
| 8,863,049 B1 | 10/2014 | Lundgren et al. | |
| 8,984,461 B1 | 3/2015 | Ip et al. | |
| 8,990,745 B1 | 3/2015 | Coelho et al. | |
| 9,081,927 B2 | 7/2015 | Coelho et al. | |
| 9,251,299 B1* | 2/2016 | Salowe | G06F 17/50 |
| 9,275,178 B1* | 3/2016 | Fung | G06F 17/5031 |
| 9,449,196 B1 | 9/2016 | Purri et al. | |
| 9,477,802 B1 | 10/2016 | Ip et al. | |
| 2003/0056186 A1* | 3/2003 | Satoh | G06F 17/5068 |
| | | | 716/139 |
| 2005/0268267 A1* | 12/2005 | Shang | G06F 17/5072 |
| | | | 716/119 |
| 2008/0168412 A1* | 7/2008 | Cheon | G06F 17/5077 |
| | | | 716/114 |
| 2008/0294390 A1* | 11/2008 | Ravnikar | G06F 17/50 |
| | | | 703/1 |
| 2009/0027392 A1* | 1/2009 | Jadhav | G06F 17/30958 |
| | | | 345/440 |
| 2009/0282379 A1* | 11/2009 | Singh | G06F 17/5045 |
| | | | 716/119 |
| 2010/0095256 A1* | 4/2010 | Kavalpati | G06F 17/504 |
| | | | 716/111 |
| 2010/0115485 A1* | 5/2010 | Nonaka | G06F 17/5045 |
| | | | 716/119 |
| 2010/0281444 A1* | 11/2010 | Zejda | G06F 17/5031 |
| | | | 716/113 |
| 2011/0131540 A1* | 6/2011 | Wu | G06F 17/5031 |
| | | | 716/108 |
| 2013/0125072 A1* | 5/2013 | Newcomb | G06F 17/5081 |
| | | | 716/107 |
| 2013/0185686 A1* | 7/2013 | Nishimoto | G06F 17/5045 |
| | | | 716/108 |
| 2013/0219353 A1* | 8/2013 | Henrickson | G06F 17/5077 |
| | | | 716/122 |
| 2014/0033158 A1* | 1/2014 | Chang | G06F 17/5077 |
| | | | 716/131 |
| 2015/0095862 A1 | 4/2015 | Ip et al. | |
| 2015/0100932 A1 | 4/2015 | Coelho et al. | |
| 2015/0100933 A1 | 4/2015 | Coelho et al. | |
| 2015/0121326 A1* | 4/2015 | De | G06F 17/5045 |
| | | | 716/108 |
| 2016/0140281 A1* | 5/2016 | Harer | G06F 17/5022 |
| | | | 716/109 |
| 2016/0154902 A1* | 6/2016 | Korthikanti | G06F 17/5045 |
| | | | 716/107 |

* cited by examiner

LEGENDS

○ SIGNALS

◉ CONVERGENCE, DIVERGENCE POINTS

◉ INOUT PORTS

◉ INPUT PORTS

⇢ STRAIGHTFORWARD – BUFFERS ONLY

⇒ PIPELINED / LATENCY: FLOPS, LATCHES

▪▪▪▶ CONDITIONAL

●──▶ COMPLEX COMBINATIONAL LOGIC

METHODS, SYSTEMS, AND ARTICLES OF MANUFACTURE FOR AUTOMATIC EXTRACTION OF CONNECTIVITY INFORMATION FOR IMPLEMENTATION OF ELECTRONIC DESIGNS

CROSS REFERENCE TO RELATED APPLICATION(S)

This application is cross related to U.S. patent application Ser. No. 14/754,331 filed concurrently and entitled "METHODS, SYSTEMS, AND COMPUTER PROGRAM PRODUCT FOR CONNECTIVITY VERIFICATION OF ELECTRONIC DESIGNS". The content of the aforementioned U.S. patent application is hereby expressly incorporated by reference in its entirety for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

During connectivity verification, verification tools may receive a connectivity specification that captures the source signal, the destination signal, and the condition (e.g., conditions due to multiplexers) and/or latency (e.g., timing delay due to flip-flops) in which the source and destination signals are connected. The specification may be further translated into a property to be proved or disproved by the verification tools. An earlier challenge arose in providing such connectivity specifications due to the increasing complexities of modern electronic designs. Some conventional approaches provide automatic connectivity extraction that traverses a design description based on structural analyses and aggregates various conditions or latencies during the traversal. Such conventional approaches either provide a simple connectivity specification including merely the source and destination signals or an overly complex connectivity specification listing whatever the traversal encounters in the design description.

These conventional approaches thus produce either an overly simple specification that does not provide much useful information other than the source and destination signals and the conditions or latencies or an overly complex specification that includes overly detailed information in a complex format and arrangement for users to comprehend, especially when the traversal encounters complex logic. In addition, users have little control over or customizations for these conventional automatic extraction approaches. For example, users may not specify one or more source signals (or one or more destination signals) or one or more instances and expect the automatic extraction mechanism to extract the correct outputs for the provided one or more source signals or the one or more instances. User also may not have much control over where the traversal and hence the extraction will stop to produce, for example, partial connectivity for a smaller segment of a net of interest.

Therefore, there exists a need for a method, system, and computer program product for automatic extraction of connectivity information for implementation of electronic designs that provide greater and more flexible controls and customizations for extracting connectivity information that may be further customized with the desired level of details.

SUMMARY

Disclosed are method(s), system(s), and article(s) of manufacture for automatic extraction of connectivity information for implementation of electronic designs in various embodiments. Some first embodiments are directed at a method for automatic extraction of connectivity information for implementation of electronic designs.

In these first embodiments, at least a portion of an electronic design may be traversed, and a plurality of circuit component designs that are encountered during the traversal may be classified or categorized into multiple categories. Connectivity information may be extracted for the at least the portion of the electronic design based in part or in whole upon one or more criteria. The at least the portion of the electronic design may be devised or implemented by using at least the extracted connectivity information. A connectivity data structure may be incrementally constructed with the extracted connectivity information. Two or more circuit component designs that have been categorized into the same category may be grouped into a single element in the connectivity data structure. The connectivity data structure may be customized based in part or in whole upon one or more customization criteria.

Some embodiments are directed at one or more hardware mechanisms that include and/or function in conjunction with at least one micro-processor as well as other related components or architectures of one or more computing systems and may be invoked to perform any of the methods, processes, or sub-processes disclosed herein. The hardware system may include one or more variants of a coupling detection mechanism, a shape processing mechanism, a factitious trace mechanism, a factitious trace marking mechanism, a coupled trace grouping mechanism, and/or one or more analysis or simulation mechanisms in some embodiments.

Each of these mechanisms may include or function in tandem with electrical circuitry and one or more microprocessors each having one or more processor cores to perform its intended functions. The hardware system may further include one or more forms of non-transitory machine-readable storage media or persistent storage devices to temporarily or persistently store various types of data or information, various design rules, various libraries, selected and selectable targets, or any other suitable information or data, etc. A mechanism is initialized in a computing system so that the software portion of the mechanism is stored in memory (e.g., random access memory) to be executed by one or more processors or processor cores off the computing system to perform at least a part of the functionality of the mechanism. Some illustrative modules or components of the hardware system may be found in the System Architecture Overview section below.

Some embodiments are directed at an article of manufacture that includes a non-transitory machine-accessible storage medium having stored thereupon a sequence of instructions which, when executed by at least one micro-processor or at least one processor core, causes the at least one micro-processor or the at least one processor core to perform any of the methods, processes, or sub-processes disclosed herein. Some illustrative forms of the non-transitory machine-readable storage media may also be found in the System Architecture Overview section below.

More details of various aspects of the methods, systems, or articles of manufacture for implementing coplanar waveguide transmission lines in an electronic design are described below with reference to FIGS. 1-5.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments are directed to a method, system, and computer program product for verifying connectivity of an electronic design. Other objects, features, and advantages of the invention are described in the detailed description, figures, and claims.

In some embodiments, at least a portion of an electronic design may be traversed. The circuit component designs or logic elements encountered during the traversal may be classified or categorized into one or more predetermined categories. Adjacent circuit components classified or categorized into the same category may be grouped or collapsed into a single element represented in a connectivity data structure for the at least the portion of the electronic design. Connectivity information may be extracted for the at least the portion of the electronic design during traversal. A connectivity data structure may be constructed incrementally or in batches with the extracted connectivity information obtained during the traversal.

In some embodiments where an electronic design includes complex logic elements, the connectivity information may be partitioned into a plurality of portions with one or more intermediate points to reduce the pertinent connectivity information for the complex logic elements into simpler forms. The connectivity data structure may also be customized with one or more customization criteria. Path properties may also be determined based in part or in whole upon the extracted connectivity information. The construction of a connectivity data structure incrementally or in batches also provides fine grain controls over the traversal process so that users may start, restart, resume, stop, or halt the traversal process with these fine grain controls.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of various embodiments, unless otherwise specifically described in particular embodiment(s) or recited in the claim(s).

Where certain elements of embodiments may be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration. More details about various processes or modules to implement various embodiments are further described below with reference to FIGS. 1-5.

Figure 1:
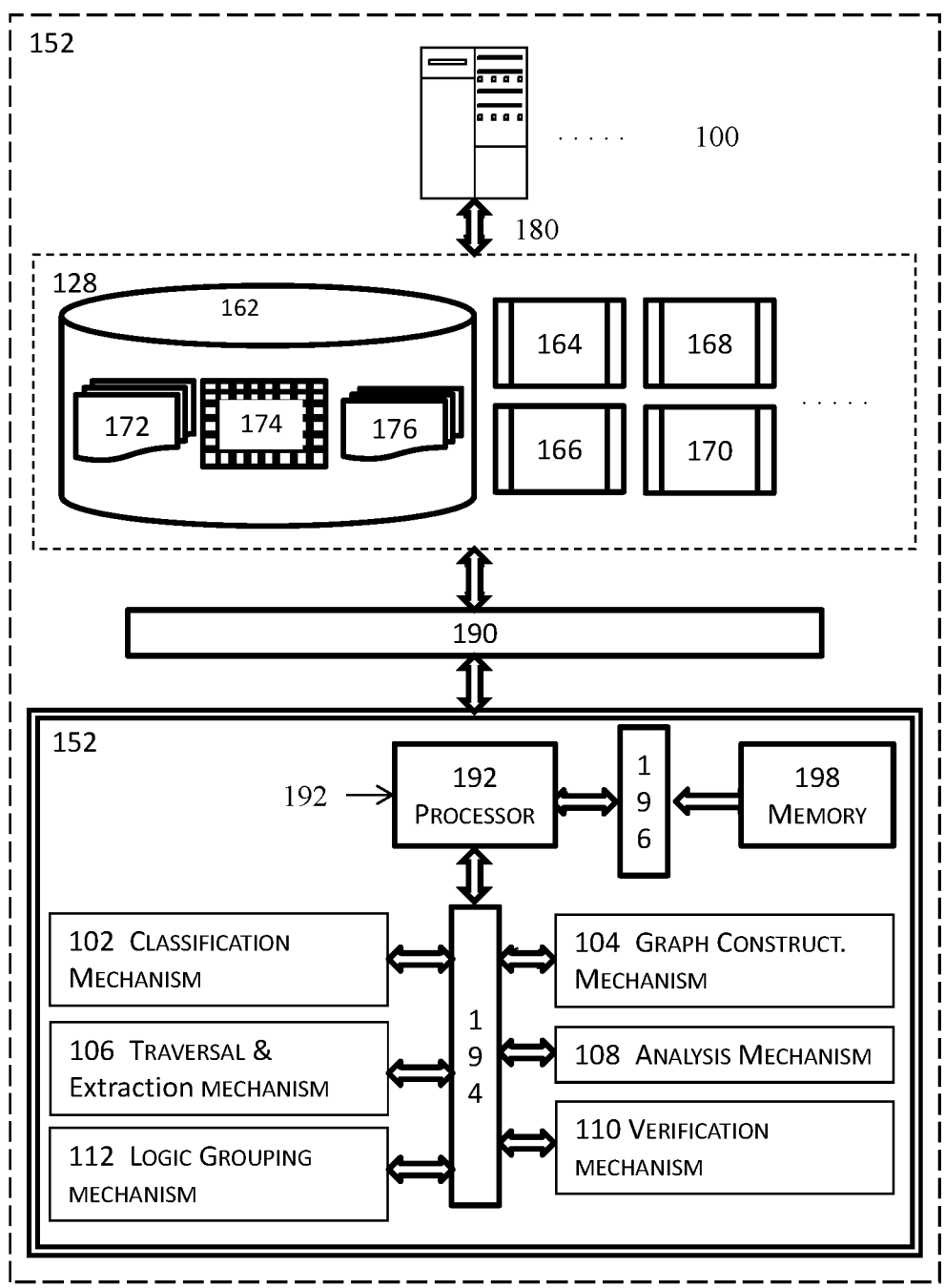
FIG. 1 illustrates a high level schematic block diagram for automatic extraction of connectivity information for implementation of electronic designs in one or more embodiments.

FIG. 1 illustrates a high level schematic block diagrams for automatic extraction of connectivity information for implementation of electronic designs in one or more embodiments. More specifically, FIG. 1 illustrates an illustrative high level schematic block diagrams for implementing coplanar waveguide transmission lines in electronic designs and may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise a floorplanner, a global routing engine, and/or a detail routing engine 164, a layout editor 166, a design rule checker 168, a verification engine 170, etc.

The one or more computing systems 100 may further write to and read from a local or remote non-transitory computer accessible storage 162 that stores thereupon data or information such as, but not limited to, one or more databases (174) such as schematic design database(s) or physical design database(s), electronic circuit design specification database(s), various statistics, various data, rule decks, various design rules, constraints, etc. (172), or other information or data (176) that may be used to facilitate the performance of various functions to achieve the intended purposes.

In some embodiments, the one or more computing systems 100 may include or, either directly or indirectly through the various resources 128, invoke a set of mechanisms 152 including hardware mechanisms and software modules or combinations of one or more hardware mechanisms and one or more software modules that may comprises a classification mechanism 102 to classify or categorize circuit component designs into categories based in part or in whole upon one or more criteria including, for example, the contribution of circuit component designs to connection definitions, the contribution of circuit component designs to timing attributes (e.g., delay, etc.), the contribution of circuit component designs to conditions of connection, etc. The set of mechanisms 152 may also include a graph construction mechanism 104 to construct a graph for an electronic design or a portion thereof.

The set of mechanisms 152 may further optionally include a traversal and extraction mechanism 106 to traverse a design or a portion thereof from a node, an input, an output, an instance, etc. in a forward direction or a backward direction and to extract connectivity information along the traversal according to one or more extraction criteria (e.g., a user specified stopping point for traversal, etc.) In addition or in the alternative, the set of mechanisms 152 may include an analysis mechanism 108 to perform one or more analyses for the electronic design under verification or a portion thereof, a verification mechanism 110 to perform various verifications on electronic designs such as proving or disproving properties, and a logic grouping mechanism 112 to group circuit component designs.

In some embodiments, the computing system 100 may include the various resources 128 such that these various resources may be invoked from within the computing system via a computer bus 180 (e.g., a data bus interfacing a microprocessor 192 and the non-transitory computer accessible storage medium 198 or a system bus 190 between a microprocessor 192 and one or more engines in the various resources 128). In some other embodiments, some or all of these various resources may be located remotely from the computing system 100 such that the computing system may access the some or all of these resources via a computer bus 180 and one or more network components.

The computing system may also include one or more mechanisms in the set of mechanisms 152. One or more mechanisms in the set 152 may include or at least function in tandem with a microprocessor 192 via a computer bus 194 in some embodiments. In these embodiments, a single microprocessor 192 may be included in and thus shared among more than one mechanism even when the computing system 100 includes only one microprocessor 192. A microprocessor 192 may further access some non-transitory memory 198 (e.g., random access memory or RAM) via a system bus 196 to read and/or write data during the microprocessor's execution of processes.

Figure 2:
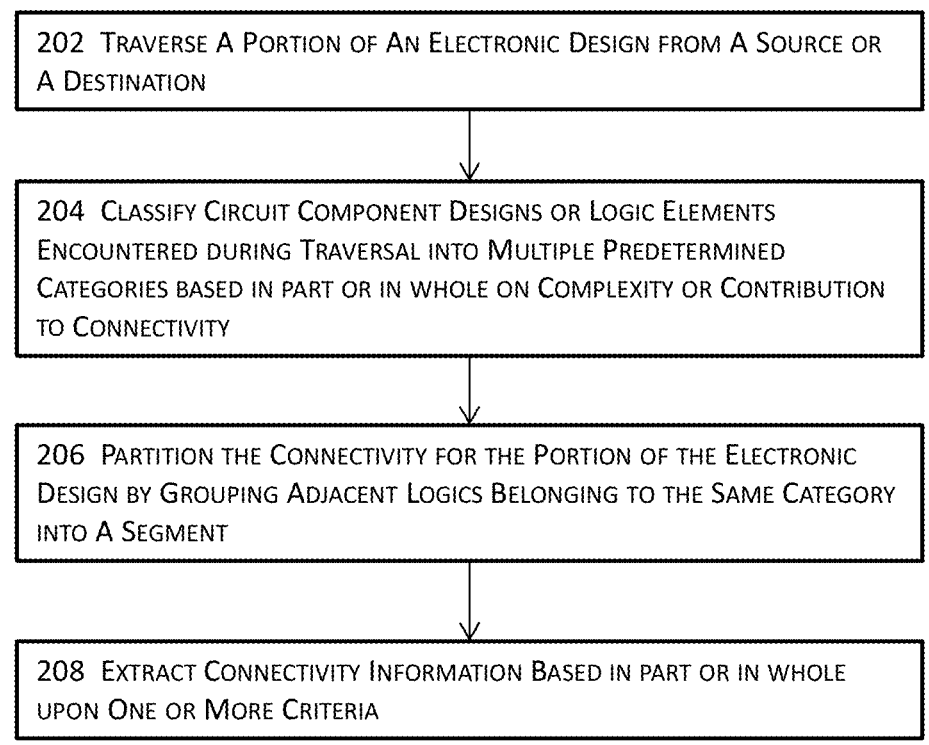
FIG. 2 illustrates a high block diagram for automatic extraction of connectivity information for implementation of electronic designs in one or more embodiments.

FIG. 2 illustrates a high block diagram for automatic extraction of connectivity information for implementation of electronic designs in one or more embodiments. In these one or more embodiments, an electronic design or a portion thereof may be traversed at 202. An electronic design may be traversed forward from one or more sources (e.g., one or more source signals, one or more source instances, or any combinations thereof) or backward from one or more destinations (e.g., one or more destination signals, one or more destination instances, or any combinations thereof). Logics or circuit component designs encountered during the traversal may be classified into one or more categories at 204 based in part or in whole upon one or more criteria.

In some embodiments, the one or more criteria may include, for example, the contribution of circuit component designs or logic to connection definitions, timing attributes (e.g., delay, etc.), conditions of connection, or any combinations thereof. In some embodiments, circuit component designs or logic may be categorizes into categories including, for example, a simple buffer, delay elements (e.g., flops, latches, etc.), conditional elements (e.g., multiplexers), a divergence point where a path splits into two or more parallel paths, a convergence point where two or more paths merge back into a single path, and one or more complex elements that are not classifiable into the other categories.

Once the categories of circuit component designs or logic are identified, connectivity may be partitioned at 206 for the identified electronic design or portion thereof by grouping immediately neighboring logics or circuit component designs of the same category into a segment. In some embodiments where a graph is subsequently constructed with the information extracted by traversing the electronic design, immediately neighboring circuit component designs or logics of the same category may be grouped into a segment represented as an edge connecting two nodes in the graph.

For example, two or more adjacent buffers may be grouped into a segment in a graph representing the electronic design or the portion thereof identified at 202. At 208, connectivity information (e.g., one or more condition definitions, one or more properties, etc.) may be extracted based in part or in whole upon one or more criteria. In some embodiments, the one or more criteria include the results of one or more analyses. For example, one or more functional analyses or path analyses may be performed to itemize simple conditions into a series of signal value pairs and/or to capture complex conditions as a generic Boolean condition. This process for extracting or generating connectivity information by traversal, one or more analyses, and extraction may be sometimes referred to as a "reverse connectivity" process, and the underlying analysis may be sometimes referred to as a reverse connectivity analysis.

With the extracted connectivity information, one or more properties may be generated and verified by proving or disproving these one or more properties. In some embodiments where the verification of a property fails, the at least the portion of the electronic design may be revised, and the property may be verified against the revised portion of the electronic design. If the verification of the property against the revised portion of the electronic design fails, connectivity information may be extracted from at least the revised portion. An updated property may then be verified against the revised portion. More details about these acts described above with reference to FIG. 2 will be provided below with reference to FIGS. 3A-D and 4A-G below.

Figure 3A:
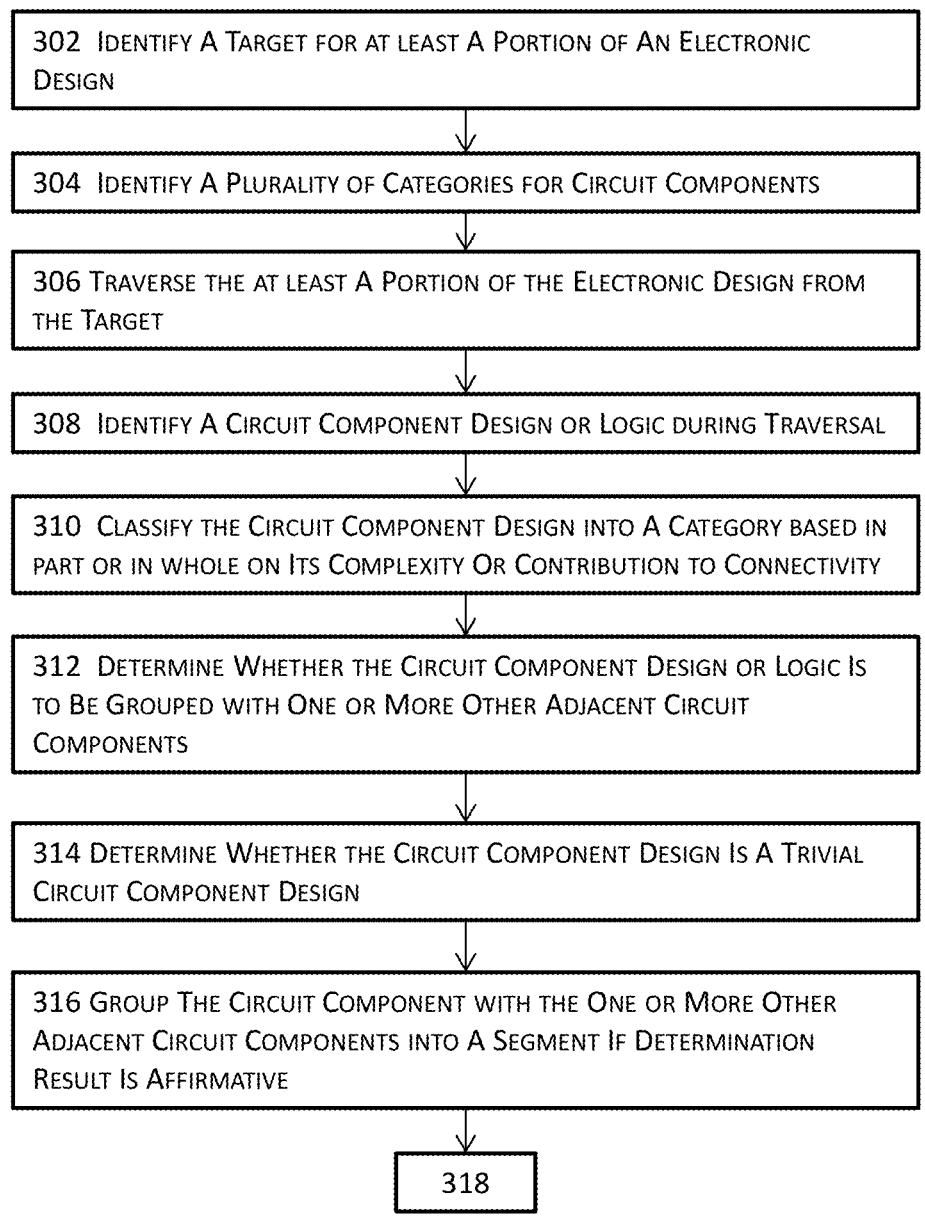
FIGS. 3A-C jointly illustrate a more detailed block diagram for automatic extraction of connectivity information for implementation of electronic designs in one or more embodiments.
Figure 3B:
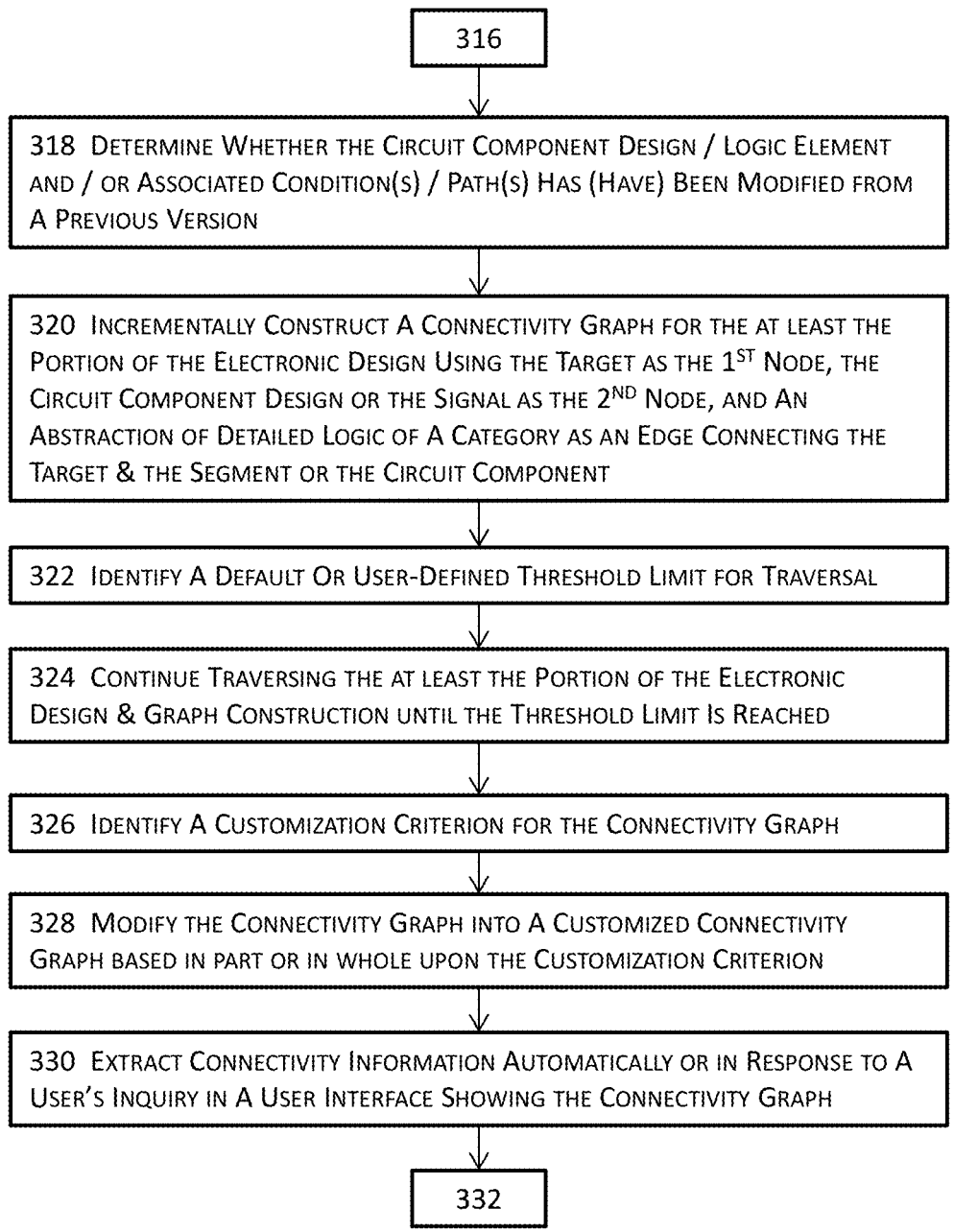
Figure 3C:
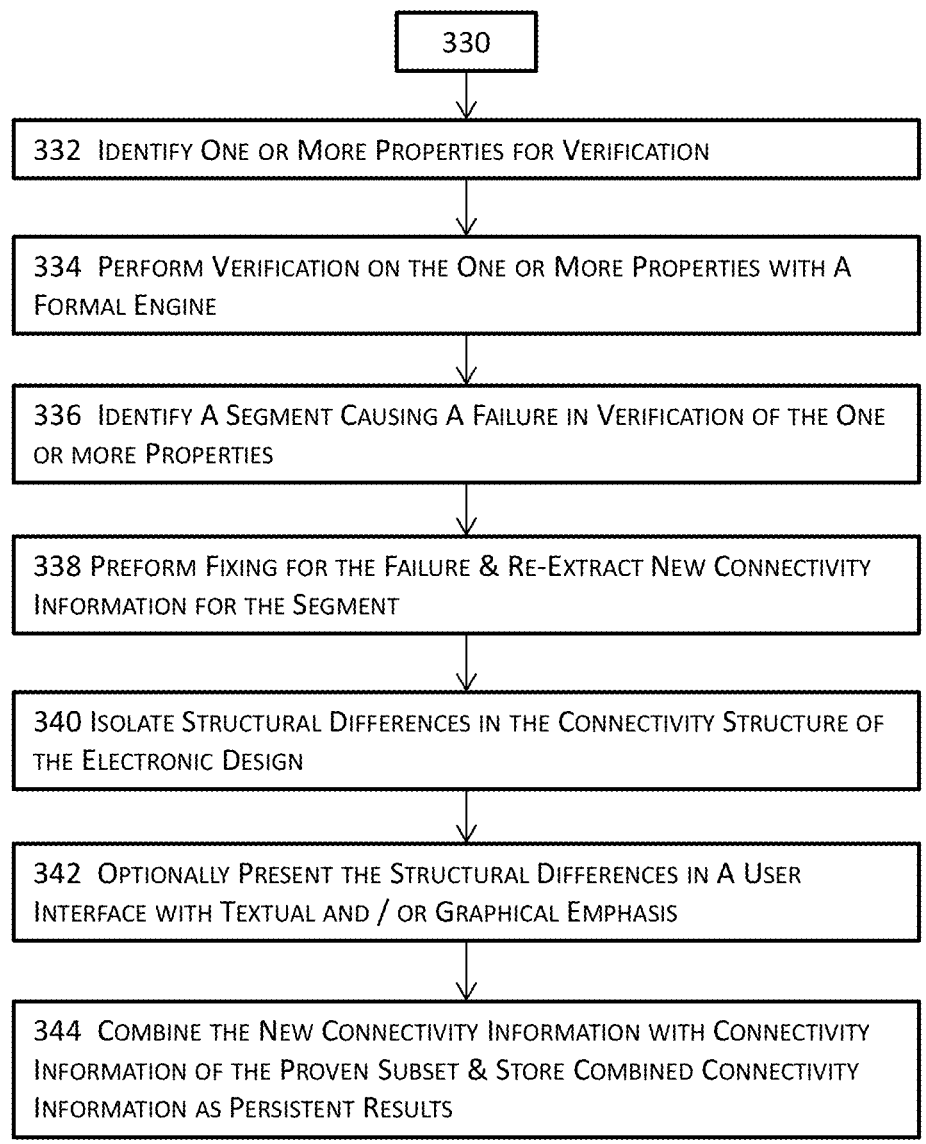

FIGS. 3A-C jointly illustrate a more detailed block diagram for automatic extraction of connectivity information for implementation of electronic designs in one or more embodiments. In these one or more embodiments illustrated in FIGS. 3A-C, a target may be identified at 302 for at least a portion of an electronic design. A target may include, for example, one or more source signals, one or more destination signals, one or more source instances, one or more destination instances, or any combinations thereof in some embodiments.

A plurality of categories for circuit component designs or logic may be identified at 304. The plurality of categories may be predetermined in some embodiments. As described above with reference to FIG. 2, the plurality of categories include, for example, a simple buffer, delay elements (e.g., flops, latches, etc.), conditional elements (e.g., multiplexers), a divergence point where a path splits into two or more parallel paths, a convergence point where two or more paths merge back into a single path, and one or more complex elements that are not classifiable into the other categories.

At least a portion of the electronic design may be traversed at 306 from the target identified at 302. In some embodiments where the target includes one or more sources (e.g., one or more source signals, one or more source instances, one or more source instances matching the user-provided module names, or any combinations thereof), the at least the portion of the electronic design may be traversed forward. In some embodiments where the target includes one or more destinations (e.g., one or more destination signals, one or more destination instances, one or more source instances matching the user-provided module names, or any combinations thereof), the at least the portion of the electronic design may be traversed backward.

At 308, a circuit component design or logic may be identified at 308 from the at least the portion of the electronic design during the traversal of the circuit design from the target. The identified circuit component design or logic may then be classified or categorized at 310 into a category of the plurality of categories identified at 304. At 312, whether or not the identified circuit component design or logic belongs to the same category as one or more other adjacent circuit component designs or logic elements. It may also be determined whether or not the circuit component design or logic element is a trivial circuit component design at 314.

In some embodiments where the circuit component design or logic is categorized or classified into a different category as the one or more other adjacent circuit components or logic elements, the traversal may proceed to identify the next circuit component design or logic. In some other embodiments where the circuit component design or logic is categorized or classified into the same category as the one or more other adjacent circuit components or logic elements, the circuit component design or logic may be grouped at 316 with the one or more other adjacent circuit components or logic elements into a group or a segment.

A single group of multiple circuit component designs or logic elements may be represented graphically as a single element associated or annotated with information including the identifications and connectivity of these multiple circuit component designs or logic elements.

For example, a single group of multiple circuit component designs or logic elements of the same category may be represented as a segment in a data structure (e.g., a connectivity graph) for the at least the portion of the electronic design. The single element (e.g., a segment) represents an abstraction of the detailed circuit component designs or logic elements that have been classified or categorized into the same category. The process illustrated in FIGS. 3A-C may further optionally include determining whether or not the identified circuit component design or logic element or the condition for a signal to reach the identified circuit component or logic element has been modified at 318.

In some embodiments where it is determined that the identified circuit component design or logic element or the condition has been modified, the identified circuit component design or logic element or the condition or even the single group (e.g., a segment in a connectivity graph) including the identified circuit component design or logic element or the condition may be represented with textual emphasis, graphical emphasis, or a combination of both textual and graphical emphasis in a user interface. At 320, a connectivity graph may be constructed for the at least the portion of the electronic design using the target identified at 302 as the source or the first node and the circuit component design, the logic element, or the signal(s) thereof identified at 308 or the group determined at 316 as the second node in the graph. In addition, the signal propagated from the first In some embodiments, a connectivity graph may be constructed incrementally as the circuit component designs, logic elements, or groups are identified during the traversal of the at least the portion of the electronic design. In some other embodiments, a connectivity graph may be constructed in one or more batches, where a batch includes multiple groups or multiple circuit component designs or logic elements belonging to two or more categories. A default or user defined threshold limit, a stopping point, or a stopping criterion for traversal of the at least the portion of the electronic design may be identified at 322.

For example, a user may specify where or how a traversal may stop or define how a traversal may stop for the at least the portion of the electronic design. The traversal and the construction of the connectivity graph may continue at 324 if the threshold limit, the stopping point, or the stopping criterion for traversal has not been reached. A customization criterion may be optionally identified at 326 for the connectivity graph. A customization criterion may be used to alter the representation of a connectivity graph. For example, a customization criterion may be used to hide one or more categories of circuit component designs or groups in a connectivity graph.

Customization criteria may include, for example, a criterion for filtering out one or more types or categories of circuit component designs, signals, logic elements, logic gates, or groups in a connectivity graph; a criterion for collapsing one or more types of circuit component designs, logic elements, or groups in a connectivity graph in a connectivity graph; a criterion for ignoring, hiding, or suppressing one or more types of circuit component designs, logic elements, or groups in a connectivity graph; or any combinations thereof. It shall be noted that the terms "filtering criterion" and "customization criterion" may be used interchangeably to indicate a criterion for modifying a connectivity data structure such as a connectivity graph by suppressing, hiding, and/or de-emphasizing the appearance of one or more elements in the connectivity data structure.

The connectivity graph, regardless of whether or not its construction has completed, may be customized at 328 based in part or in whole upon the customization criterion identified at 326. For example, a user may specify a customization criterion to hide circuit component designs or groups of the "simple buffers" category; and the connectivity graph may be automatically modified to suppress or hide all circuit component designs, logic elements, or groups of the "simple buffers" category.

Suppressing or hiding elements (e.g., one or more nodes, one or more edges or segments, or any combinations thereof) of a connectivity graph suppress or hide the graphical illustration of these graph elements but does not create discontinuities in the connectivity graph. More details about customizing connectivity graphs will be described blow with reference to FIGS. 4A-H.

Connectivity information may be extracted and associated with at least one graph element (e.g., a segment in a connectivity graph) at 330 automatically or in response to a user's inquiry received in a user interface illustrating the connectivity graph. For example, a user may click on a segment of a connectivity graph, and a connectivity extraction mechanism may extract the connectivity information including the identifications of circuit component designs, conditions, or any combinations thereof with a plurality of levels of details or arrangements.

As another example, a connectivity extraction mechanism may automatically extract the connectivity information and associate the extracted connectivity information with the corresponding connectivity graph elements (e.g., nodes, segments, etc.) In some embodiments where one or more customization criteria have been identified and enforced, the connectivity may not include the connectivity information for at least one circuit component design, logic element, category, or a group that is de-emphasized, suppressed, or hidden by the one or more customization criteria.

In some other embodiments, the connectivity may nevertheless include the connectivity information for at least one circuit component design, logic element, category, or a group that is de-emphasized, suppressed, or hidden by the one or more customization criteria such that the connectivity information is coherent. For example, a customization criterion may suppress or hide simple buffers along a segment between two nodes in a connectivity graph. The extracted connectivity information between these two nodes may still include the identifications of signals and/or circuit component designs, connectivity details, source-destination pairs, and/or conditions of or associated with these two nodes so that the connectivity information does not appear to miss some connections between these two nodes.

In some embodiments, whether or at which detail level the connectivity information for de-emphasized, suppressed, or hidden circuit component designs, logic elements, categories, or a groups is to be represented may be prescribed by a user or dynamically defined or modified on the fly. In some embodiments where the traversal encounters complex logic, a functional analysis may be performed at 330 to invoke a formal proof mechanism to extract the connectivity information.

In some embodiments where only one or more sources but no destinations are provided, the connectivity graph may be incrementally constructed based in part or in whole upon a fan-out cone of the logic from the one or more sources with a plurality of nodes being candidates for a user to steer the stopping points of the current or future traversal process. These one or more nodes may be further paired with the respective source to define connections.

Similarly, in some embodiments where only one or more destinations but no sources are provided, the connectivity graph may be incrementally constructed by traversing backward from the one or more destinations based in part or in whole upon a fan-in cone of the logic from the one or more destinations with a plurality of nodes being candidates for a user to steer the stopping points of the current or future traversal process. These plurality of nodes may be further paired with their respective destinations to define connections.

In addition or in the alternative, the incremental construction of a connectivity graph may provide a set of parameters from which a user may control what connectivity information is to be extracted at 330. In some embodiments, the set of parameter may include a first parameter whose value allows a user to specify one or more categories of circuit component designs to avoid for extraction. The set of parameter may further optionally include a second parameter whose value allows a user to determine the depth of traversal in the hierarchical structure of an electronic design.

For example, a user may specify a predetermined number of hierarchical levels or dynamically alter the number of hierarchical levels to traverse. The set of parameters may further optionally comprise a third parameter whose value allows a user to limit the search for connections that include, for example, a number of segments that is equal to or smaller than a predetermined or dynamically determined number. In addition or in the alternative, the set of parameters may comprise a filtering parameter whose parameter may be statically or dynamically configured by a user to specify one or more predetermined or dynamically determined filtering criteria to filter out irrelevant nodes or signals that will not be traversed and/or to maintain relevant nodes that will be traversed.

Extraction of one or more conditions for a source signal and a destination signal may be performed by, for example, generating a path property "—from source signal—to destination signal" for a formal verification mechanism to prove or disprove. Extracting one or more conditions may further optionally include determining a counter-example with a formal verification mechanism in some embodiments. In some of these embodiments, an analysis may be performed for the determined counter-example to identify the conditions that are exercised to cause the counter-example to be true. Negation of the conditions determined immediately above may be converted or transformed into a constraint or condition.

One or more properties for verification may be identified or determined at 332. For example, connectivity information extracted from the design description for the at least the portion of the electronic design at 330 may be transformed into these one or more properties by using, for example, SystemVerilog assertions, and the property of a segment in the constructed connectivity graph may be identified at 332 accordingly. The at least the portion of the electronic design may be verified at 334 by proving or disproving the one or more properties identified at 332.

In some embodiments where the at least the portion of the electronic design is revised, a property of a segment may be verified against the revised portion of the electronic design. If the verification fails for this particular property, connectivity information may be extracted from the revised electronic design. The re-extracted connectivity information may be used to update the visual representation of the at least the portion of the electronic design or the connectivity graph by merging the re-extracted connectivity information with the existing connectivity information.

In some embodiments, the differences in the connectivity information or a representation therefor (e.g., a connectivity graph or a connectivity data structure) may also be highlighted with textual and/or graphical emphasis in the user interface. For example, the color, linetype, line weight, At 336, a segment causing the failure during verification of the one or more properties may be identified. The user interface may invoke design implementation tools to revise the circuit component designs, the logic elements for the segment, or other relevant circuit component designs or logic elements by performing one or more fixes at 338.

Once the electronic design is revised, the differences between the electronic design prior to the revision and the revised electronic design may be isolated at 340 in the connectivity structure (e.g., the connectivity graph) of the electronic design. The connectivity structure may be updated with information associated with the differences. The differences may be optionally presented at 342 in a user interface with textual and/or graphical emphasis in some embodiments.

For an electronic design that has been revised, verification of a property may be performed against the revised design. In some embodiments where proof or disproof of the property fails, connectivity information may be re-extracted for the revised portion and/or the interconnected portion thereof. The re-extracted connectivity information may be combined or merged with existing connectivity information at 344. For example, re-extracted connectivity information may be merged with existing connectivity information of one or more proven or disproved subsets of the electronic design. The connectivity information may be persistently stored in a persistent storage.

Figure 3D:
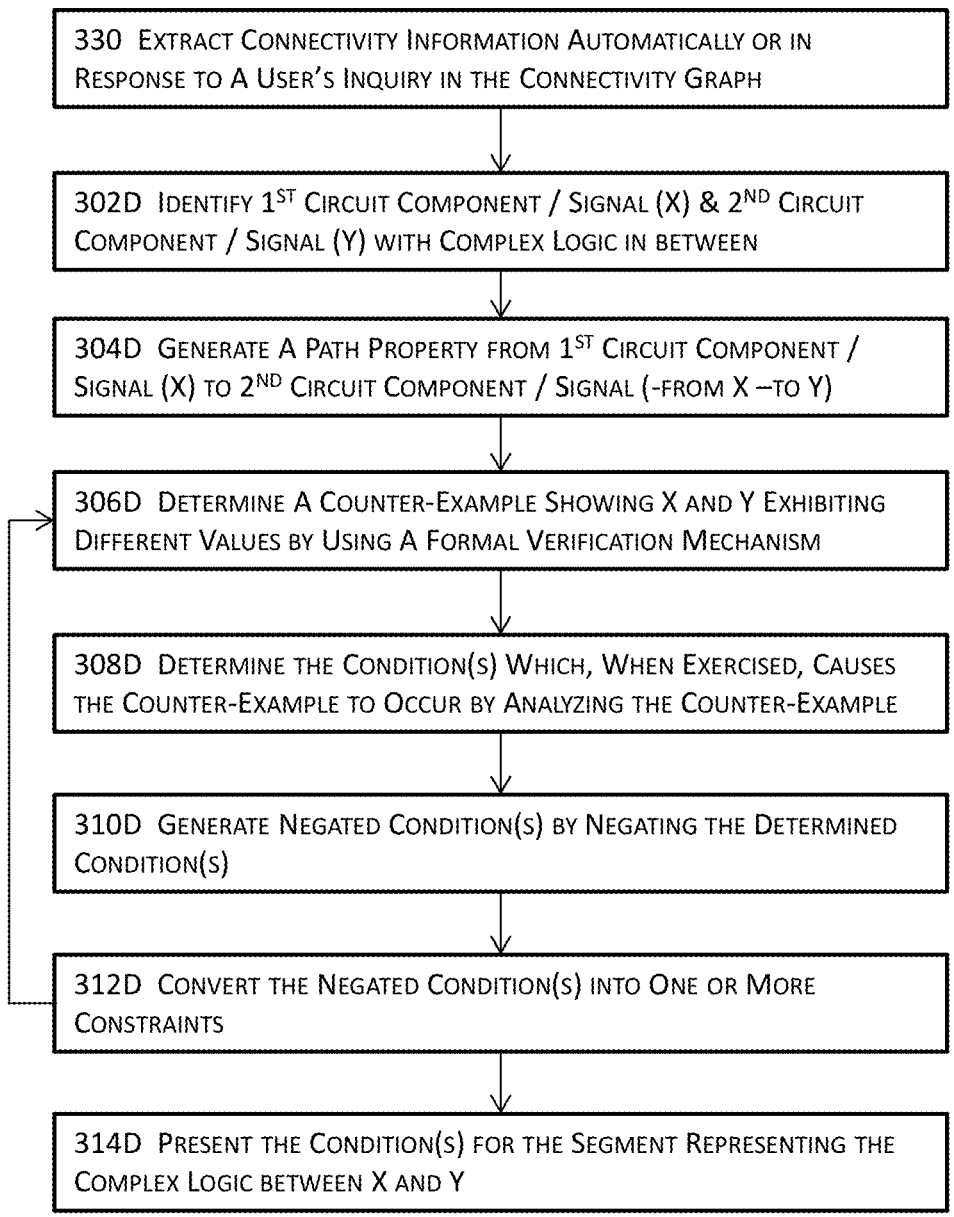
FIG. 3D illustrates more details about a part of the more detailed block diagram illustrated in FIG. 3C in one or more embodiments.

FIG. 3D illustrates more details about a part of the more detailed block diagram illustrated in FIG. 3B in one or more embodiments. More specifically, FIG. 3D illustrates more details about the act 330 of extracting conditions involving complex logic in some of the embodiments illustrated in FIGS. 3A-C. At 302D, a first circuit component design or signal and a second circuit component design or signal may be identified. To illustrate how complex logic elements are processed, the first and second circuit component designs or signals are interconnected with complex logic elements in between.

For the ease of description, the first circuit component design or signal is represented as "X", and the second circuit component design or signal is represented as "Y" in the following description. A path property may be generated at 304D from the first circuit component design or signal to the second circuit component design or signal. For example, a path property "—from X—to Y" may be generated from the first circuit component design or signal to the second circuit component design or signal at 304D.

A counter-example may be determined at 306D showing that the first circuit component design or signal (X) and the second circuit component design or signal (Y) exhibit different values. In these embodiments, a counter-example may be determined to show that (X==Y) is not true at 306D by using a formal verification mechanism. At 308D, one or more conditions which, when exercised, cause the counter-example to occur may be determined by performing one or more analyses to detect the one or more conditions.

The negation of the one or more conditions may be determined at 310D, and the negation may be further converted into one or more pieces of connectivity information at 312D. These one or more pieces of connectivity information may be extracted at 330 of FIGS. 3A-C. The flow may return to 306D to determine another counter-example and repeat the acts 306D through 312D to extract the conditions between a source and a destination involving complex logic until no further counter-examples may be found. The conditions for the edge between the source signal (X) and the destination (Y) may be presented at 314D.

Figure 4A:
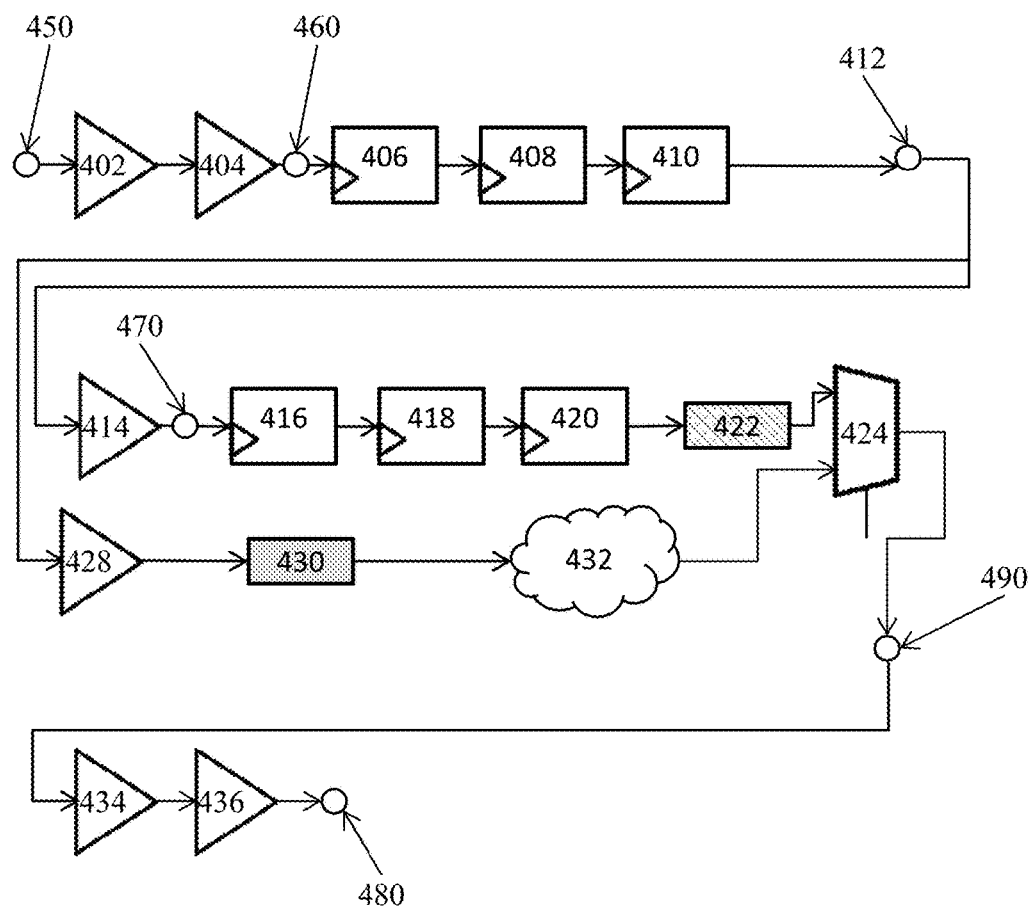
FIG. 4A illustrates a simplified schematic representation of a portion of an electronic design to which some techniques described herein apply in one or more embodiments.

FIG. 4A illustrates a simplified schematic representation of a portion of an electronic design to which some techniques described herein apply in one or more embodiments. This simplified schematic representation illustrates a path between the source 450 (e.g., "a") and the destination 480 (e.g., "i1.d"). This simplified schematic representation may be traversed from the source 450 through two buffers 402 and 404 to reach another node 460 (e.g., "b"). The traversal continues from the node 460 (e.g., "b") through three flops 406, 408, and 410 into node 412 (e.g., "c").

The node 412 is a divergent point and may lead to a first path segment through a buffer 414 to reach node 470 (e.g., "d"). The traversal along the first path segment may continue through three flops 416, 418, and 420 to reach an inout port 422 of a instance "i1" (e.g., "i1.b") and then the multiplexer 424 (e.g., with condition "i1.x|| i1.y") to reach node 490 (e.g., "i1.c"). The node 412 may also lead to a second path segment to reach an input port 430 of instance "i1" (e.g., "i1.a") through a buffer 428.

The traversal along the second path segment further proceeds through complex combination logic 432 to reach the multiplexer 424. The multiplexer 424 receives inputs from both the first and the second path segments and is thus a convergent point. A functional analysis of the complex combination logic 432 may extract a complex condition for the connection (e.g., "c1"). The traversal may further proceed through buffers 434 and 436 to reach the destination 480. In some embodiments, the connectivity information may be represented in a textual form or in a property form as a series of properties. In the above example, the connection between the source 450 ("a") and the destination 480 ("i1.d") may thus include:

$b == a$ $c == \$past(b,3)$ (e.g., with appropriate clock declaration using "clk")

$d == c$ $i1.b == \$past(d,3)$ (e.g., with appropriate clock declaration using "gclk")

$i1.a == c$ $(i1.x || i1.y) | \rightarrow i1.c = i1.b$ $expr1 \&\& \sim(i1.x || i1.y) | \rightarrow i1.c = i1.a$ $i1.d = i1.c$ In some embodiments, the aforementioned connectivity information may be filtered during review by a user. For example, the aforementioned connectivity information may be presented as a listing including only the conditions as follows:

$i1.x || i1.y$ $i1.x \&\& i1.y$

As another example, the aforementioned connectivity information may be presented as a listing including only the delay elements (e.g., latency) as follows:

clk: 3 gclk: 3

As another example, the aforementioned connectivity information may be presented as a listing including a property for the lower path between the divergent point 412 and the convergent point 426 as follows:

$(local\_var=a) \#\#3 (c1 \&\& \sim(i1.x || i1.y))$
$| \rightarrow i1.d == local\_var$ In the above examples, the classification and categorization of circuit component designs and logic elements provides the capability of partitioning complex logic elements by generating intermediate points along a path. These intermediate points may be used to partition the resulting properties while hiding some or all of the details of signals within these intermediate points.

Figure 4B:
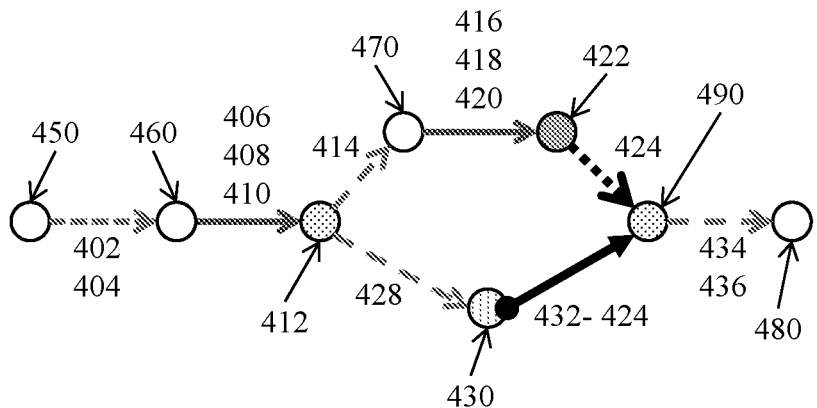
FIG. 4B illustrates an example of automatic extraction for the portion of the electronic design illustrated in FIG. 4A in one or more embodiments.

FIG. 4B illustrates an example of automatic extraction for the portion of the electronic design illustrated in FIG. 4A in one or more embodiments. More specifically, FIG. 4B illustrates an example of a connectivity graph for the simplified schematic representation illustrated in FIG. 4A. The connectivity graph illustrated in FIG. 4B may be incrementally constructed during the traversal of the simplified schematic representation. Assuming the traversal starts from the source 450, the connectivity graph may thus include the first node 450 indicative of the source ("a").

As the simplified schematic representation is traversed through buffers 402 and 404 to reach node 460, these two buffers are categorized into the same category (e.g., the simple buffer category) and may thus be grouped into a single element (e.g., a segment) in the connectivity graph. The connectivity graph may be annotated with such groupings. In this example illustrated in FIG. 4B, the segment between node 450 and node 460 may be annotated with the identifications of buffers 402 and 404. The simplified schematic representation is further traversed through three flops 406, 408, and 410 to reach the divergent point—the node 412.

These three flops are also categorized or classified into the same category—"delay elements"—and may thus be grouped into a single element in the connectivity graph. In this example, the three flops are grouped into a segment connecting nodes 460 and 412. The divergent point 412 and the segment indicative of the grouping of three flops (406, 408, and 410) may thus be added and interconnected in the connectivity graph. The simplified schematic design may be traversed from the divergent point (the node 412) through the buffer 414 along the first path segment to reach node 470.

Both node 470 and the segment indicative of the buffer 414 may be incrementally added to the connectivity graph. The traversal continues to reach the inout port 422 through three flops 416, 418, and 420 which may be grouped into a single segment in the connectivity graph and may further proceed to the convergent point (the OR gate 426) through the multiplexer 424. The single segment representing the group including the three flops 416, 418, and 420 may also be optionally annotated or associated with the delay elements group (flops 416, 418, and 420).

From the convergent point (the multiplexer 424), the traversal may continue to reach the destination 480 through two buffers 434 and 436. These two buffers 434 and 436 may also be grouped into and represented as a single segment in the connected graph. The traversal may continue from the divergent point (the node 412) along the second path segment to reach the input port 430 via the buffer 428. The node representing the input port 430 and the segment indicative of the buffer 428 may also be incrementally added to the connectivity graph. From the input port 430, the traversal may continue along the second path segment to reach the convergent node (the multiplexer 424) through a single buffer 432. The segment indicative of the buffer 432 may also be incrementally added to the connectivity graph.

In some embodiments, segments representing different groups of circuit component designs or logic elements belonging to different categories may be represented with different graphical and/or textual emphasis to distinguish from each other. For example, segments representing different groups belonging to different categories may be graphically represented as line segments having different linetypes, thicknesses, colors, or any combinations thereof.

For example, segments representing straight forward connections such as those connecting buffers (e.g., segments 402/404, 428, 414, and 434/436), segments representing connections between pipelined elements or delay elements (e.g., segment 416/418/420 and 406/408/410), segments representing conditional connections (e.g., segment 424) or In addition or in the alternative, nodes of different types (e.g., signal nodes such as 450 and 460, divergent nodes such as 412 or convergent nodes such as 426, nodes representing inout ports such as 422, nodes representing input ports such as 430, etc.) may also be represented with different colors, textures, shapes, or any combinations thereof in a connectivity graph. One or more segments may also be annotated or associated with the corresponding connectivity information (e.g., identifications of logic elements, conditions, properties, or any combinations thereof).

The corresponding connectivity information may be attached to the segment and displayed in a user interface or may be displayed on demand (e.g., when a user clicks on the segment). For example, the segment between 450 and 460 may be associated or annotated with "402, 404" to indicate the group of buffers; the segment between 460 and 412 may be associated or annotated with "406, 408, 410" or "clk*3" to indicate the group of delay elements; the segment between 470 and 422 may be associated or annotated with "416, 418, 420" or "gclk*3" to indicate the group of delay elements; the segment between 430 and 490 may be associated or annotated with, for example, "c1" to represent the complex logic elements between the input port 430 and the multiplexer 424, and be associated with "~(i1.x||i1.y) to represent with the condition associated with the multiplexer 424 for the second path; the segment between the inout port 422 and the node 490 may be annotated or associated with "i1.x||i1.y" to represent condition associated with the multiplexer 424 for the first path; and the segment between the node 490 and the destination 480 may be associated or annotated with "434, 436" to represent the buffers.

Figure 4C:
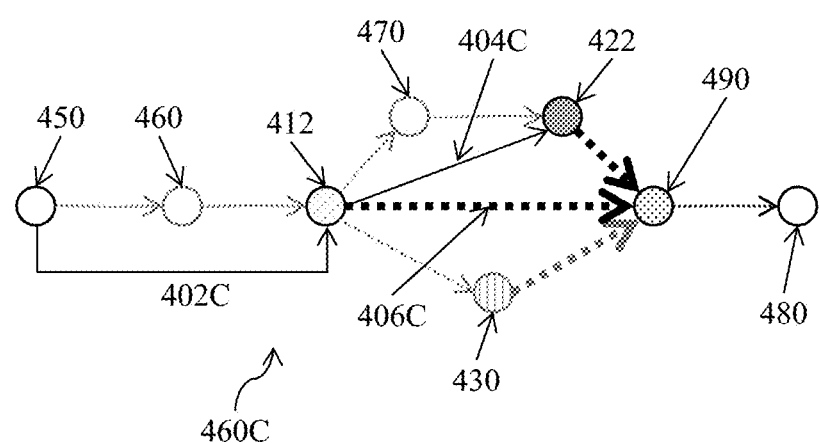
FIGS. 4C-H illustrate examples of automatic extraction for the portion of the electronic design illustrated in FIG. 4A in one or more embodiments.

FIGS. 4C-H illustrate examples of automatic extraction for the portion of the electronic design illustrated in FIG. 4A in one or more embodiments. FIG. 4C illustrates an example of a simplified connectivity graph based on a user's input or a filtering criterion. More specifically, a filtering criterion may be pre-specified or specified on the fly. In this example illustrated in FIG. 4C, only the conditions are shown in the connectivity graph while the segments associated with other types may be suppressed, hidden, or de-emphasized.

In this example, a user may desire to hide or de-emphasize the buffers and delay elements and either pre-specify such a hide criterion or dynamically specify the filtering criterion on the fly. The connectivity graph may then be updated according to the hide criterion and be presented in 460C where the segments and nodes that are hidden or de-emphasized due to the filtering criterion are de-emphasized. In the alternative, new segments such as segment 402C connecting the source 450 and the node 412, segment 404C connecting the node 412 and the inout port 422, and segment 406C connecting the NAND gate 412 and the OR gate 426 may be added to illustrate this simplified connectivity graph 460C. This hide operation conceptually merges the nodes 450 and 460, hence hiding or de-emphasizing node 460 and segment 450/460, adjusting segment 460/412 into the new segment 402C, and similarly merging nodes 412 and 270, and nodes 412 and 430.

In the alternative, segments and nodes may be removed or filtered out, instead of being just hidden. For example, if the user decides to remove and filter out all segments with complex combinational logic, the segment between nodes 430 and 490 will be removed. This will leave node 430 dangling without an outgoing segment. If the focus is on node 480 as destination, this dangling node 430 and segment between 412/430 can be removed as well, simplifying the graph as a result. In this representation, the connectivity graph is simplified to not include isolated, unconnected elements due to the application of the filtering criterion.

Figure 4D:
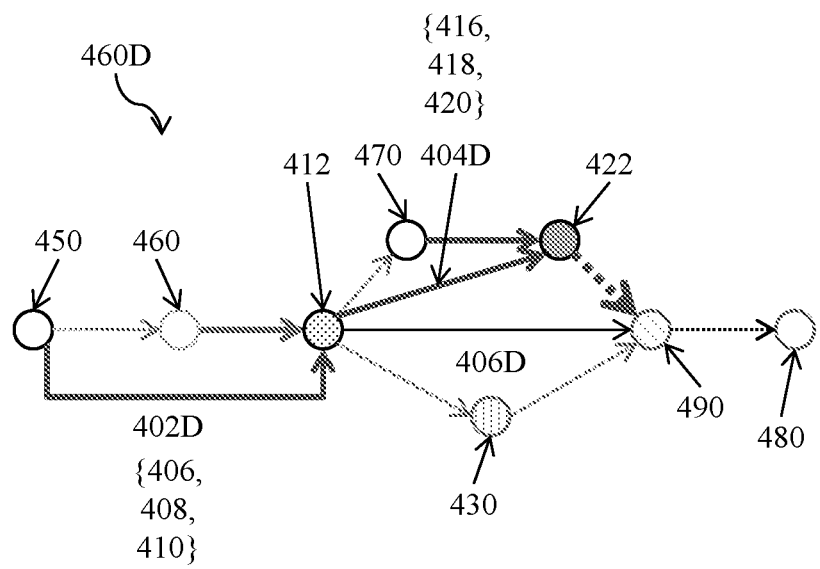
Figure 4H:
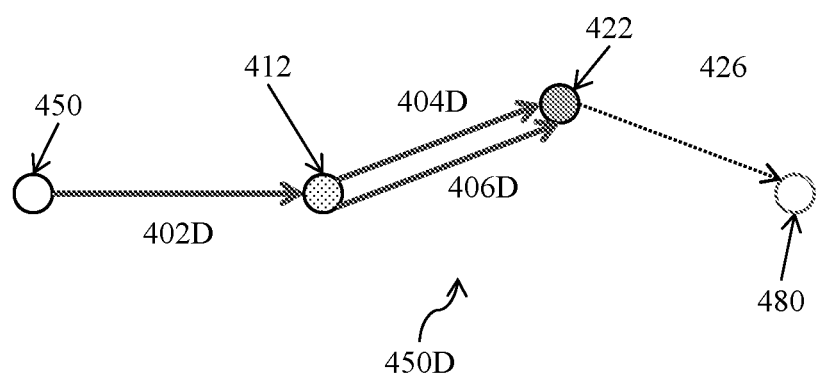

FIG. 4D illustrates another example of a simplified connectivity graph based on a user's input or a filtering criterion. More specifically, a filtering criterion may be pre-specified or specified on the fly to show only the delay elements in the connectivity graph while suppressing, hiding, or de-emphasizing the other segments associated with other types of connectivity information. In this example, a user may desire to show only the delay elements by either pre-specifying such a filtering criterion or dynamically specifying the filtering criterion on the fly.

The connectivity graph may then be updated according to the hide criterion to de-emphasize, suppress, or hide elements other than the delay elements and may be presented in the representation 460D where the segments and nodes that are hidden due to the hide criterion are de-emphasized. The delay elements 406, 408, and 410 may be associated or annotated with a new segment 402D connecting the source 450 and the node 412. The delay elements 416, 418, and 420 associated or annotated with the segment connecting node 470 and the inout port 422 may be associated or annotated with a new segment 404D connecting the node 412 and the inout port 422. Furthermore, the segment connecting node 422 and node 490 may be hidden or de-emphasized by the hide criterion; and due to the convergence arrangement in the graph, the nodes 422 and 490 are merged and not new segment is created, resulting in two incoming segments into node 490 with different delay annotations.

Both the buffer 428 and the complex logic elements 432 are hidden or de-emphasized by the hide criterion. Therefore, a new segment 406D may be created in the simplified connectivity graph. The new segment may connect the node 412 and the node 490 as shown in the representation 450D in FIG. 4H. In both representations 450D and 460D, the segment 404D connecting the nodes 412 and 490, with 422 hidden in the path, may be associated or annotated with the desired connectivity information such as "416, 418, 420" or "gclk*3" with appropriate clock declaration using "gclk". The segment 406D connecting the nodes 412 and 490 with 430 hidden in the path may be associated or annotated with desired connectivity information such as "no delay". Similarly, the segment connecting the source 450 and the node 412 may be associated or annotated with the desired connectivity information such as "406, 408, 410" or "clk*3" with appropriate clock declaration using "clk".

Figure 4E:
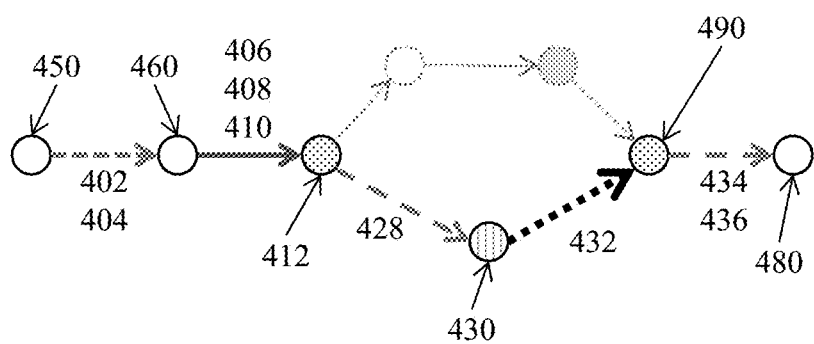

FIG. 4E illustrates another example of a simplified connectivity graph based on a user's input or a filtering criterion. More specifically, a filtering criterion may be pre-specified or specified on the fly to show only the lower path between the divergent node (412) and the convergent node (490) between the source (450) and the destination (480) in the connectivity graph while suppressing, hiding, or de-emphasizing the other segments associated with other types of connectivity information. In this example, a user may desire to show only the lower path between the divergent and convergent nodes between the source and destination. In response to this filtering criterion, the connectivity graph may be updated to hide or de-emphasize the upper path between the divergent node 412 and the convergent node 490. The illustrated segments may still be associated or annotated with the pertinent connectivity information or property in this simplified connectivity graph illustrated in FIG. 4E. For example, the connectivity graph may be associated or annotated with the following property:

(local_var)##3(c1&&~(i1.x∥i1.y))|→i1.d==local_var.

Similarly, a user may also pre-specify or specify on the fly to show only the upper path between the divergent and convergent nodes between the source 450 and destination 480. In these latter embodiments, nodes 470 and 422 as well as the segments connecting 412 to 470, 470 to 422, and 422 to 490 will be shown in the simplified connectivity graph, whereas node 430, the segment connecting 412 and 430, and the segment connecting 430 and 490 may be hidden or de-emphasized. The illustrated segments may still be associated or annotated with the pertinent connectivity information or property in this simplified connectivity graph illustrated in FIG. 4E. For example, the connectivity graph may be associated or annotated with the following property (using SystemVerilog like syntax, but with latencies marked with the corresponding sampling clocks):

(local_var=a)(##3 on clk)(##3 on gclk)(i1.x∥i1.y)
|→i1.d==local_var

As presented above with reference to FIGS. 3A-C, the incremental construction of a connectivity graph may provide a set of parameters from which a user may control what connectivity information is to be extracted. For example, during the incremental construction of the connectivity graph or prior to the beginning of construction of the connectivity graph, a user may determine to stop before the traversal reaches a convergent point for the user to determine how the traversal is to continue before the traversal process reaches the convergent point and perhaps generates too much information. Or, a user may desire to halt the traversal process when the traversal encounters complex logic elements or combinational elements.

Figure 4F:
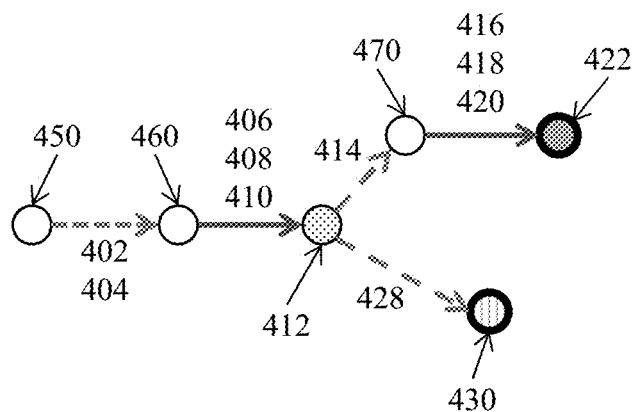
Figure 4G:
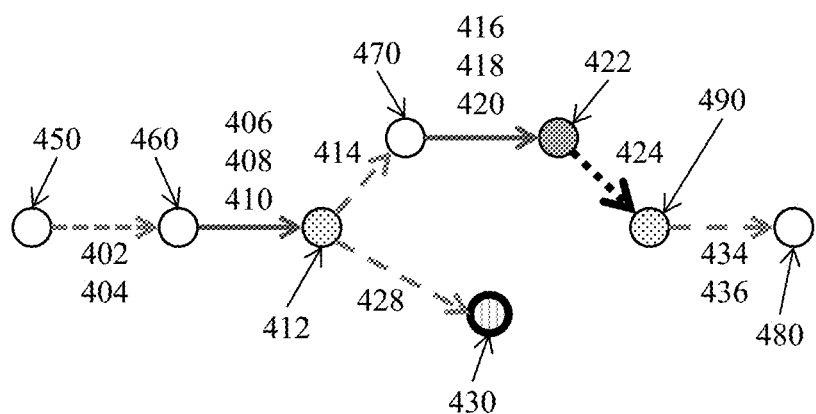

In this example, the traversal process begins from the source 450 and halts at the inout port 422 and the input port 430 as illustrated in FIG. 4F which illustrates controlling the stopping or halting point for a traversal process in one or more embodiments. While the traversal process is stopped or halted as shown in FIG. 4F, the user may provide further input to restart or resume the traversal process from where the traversal process is stopped or halted. For example, the user may decide to restart or resume the traversal process from the upper path by, for example, clicking on the node or the inout port 422. The traversal process may then be resumed or restarted from node 422 until it reaches the destination (480) or until another stopping or halting point is reached. The result of this continued traversal is illustrated in FIG. 4G. FIG. 4G may also show a user's control over the traversal process to stop when encountering complex logic elements in some embodiments.

System Architecture Overview

Figure 5:
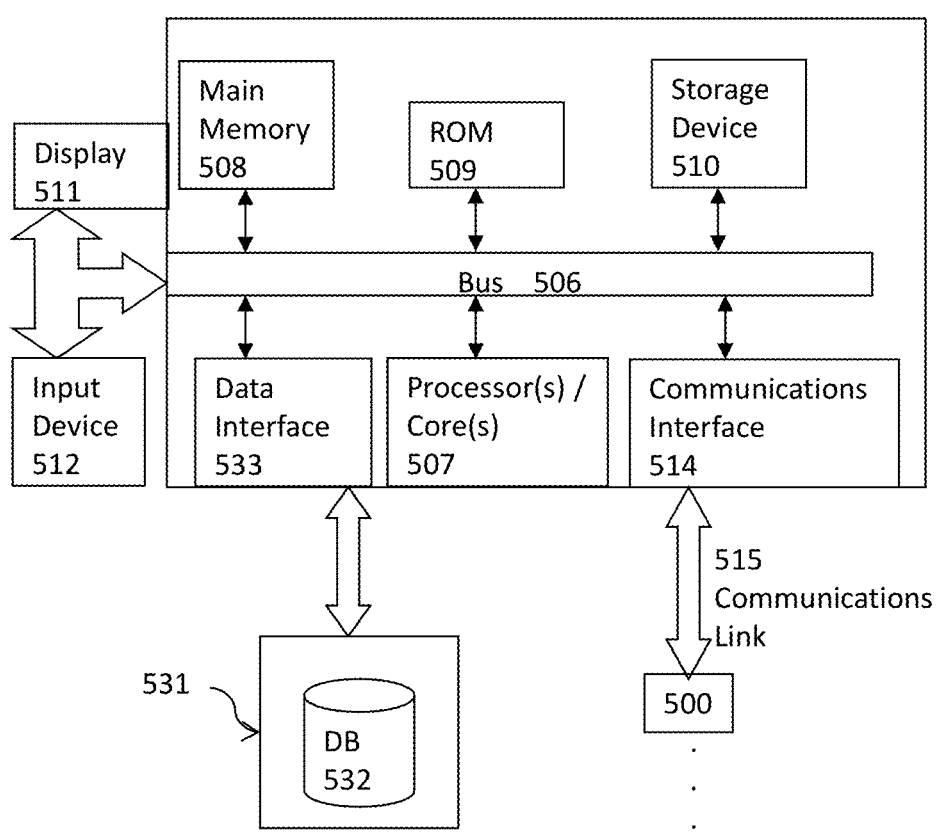
FIG. 5 illustrates a computerized system on which a method for automatic extraction of connectivity information for implementation of electronic designs may be implemented.

FIG. 5 illustrates a block diagram of an illustrative computing system 500 suitable for implementing coplanar waveguide transmission lines in electronic designs as described in the preceding paragraphs with reference to various figures. Computer system 500 includes a bus 506 or other communication mechanism for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control (not shown).

According to one embodiment, computing system 500 performs specific operations by one or more processor or processor cores 507 executing one or more sequences of one or more instructions contained in system memory 508. Such instructions may be read into system memory 508 from another computer readable/usable storage medium, such as static storage device 509 or disk drive 510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 507, where the one or more processors, one or more processor cores, or combination thereof executes one or more threads. For example, various identifications, determinations, groupings, processing, markings, detection, analyses, or simulations, etc. may be performed by one or more mechanisms (e.g., one or more mechanisms described in FIG. 1A) including or functioning in tandem with one or more processors, one or more processor cores, or combination thereof.

A mechanisms described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a mechanism described herein may be implemented as an application-specific integrated circuit (ASIC) in some embodiments.

In these embodiments, a mechanism may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of mechanism. A mechanism described herein or an equivalent thereof may perform its respective functions alone or in conjunction with one or more other mechanisms. A mechanism described herein or an equivalent thereof may thus invoke one or more other mechanisms by, for example, issuing one or more commands or function calls. The invocation of one or more other mechanisms may be fully automated or may involve one or more user inputs.

The term "computer readable storage medium" or "computer usable storage medium" as used herein refers to any non-transitory medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments of the invention, two or more computer systems 500 coupled by communication link 515 (e.g., LAN, PTSN, or wireless network) may perform the sequence of instructions required to practice the invention in coordination with one another.

Computer system 500 may transmit and receive messages, data, and instructions, including program, i.e., application code, through communication link 515 and communication interface 514. Received program code may be executed by processor 507 as it is received, and/or stored in disk drive 510, or other non-volatile storage for later execution. In an embodiment, the computing system 500 operates in conjunction with a data storage system 531, e.g., a data storage system 531 that includes a database 532 that is readily accessible by the computing system 500. The computing system 500 communicates with the data storage system 531 through a data interface 533. A data interface 533, which is coupled with the bus 506, transmits and receives electrical, electromagnetic or optical signals that include data streams representing various types of signal information, e.g., instructions, messages and data. In embodiments of the invention, the functions of the data interface 533 may be performed by the communication interface 514.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing an electronic design with automatic extraction of connectivity information, comprising:
traversing at least a portion of an electronic design from a target;
classifying circuit component designs encountered during traversal into multiple categories that comprise at least one divergent node or at least one convergent node based in part or in whole upon one or more criteria;
extracting, at a traversal and extraction module functioning in tandem with at least one micro-processor of a computing system, connectivity information from at least the multiple categories for the at least the portion of the electronic design based in part or in whole upon the one or more criteria;
reducing, using the at least one micro-processor, the connectivity information into reduced connectivity information with one or more intermediate points along one or more paths in the electronic design; and
implementing, using the at least one micro-processor, the electronic design at least by devising at least the portion of the electronic design with at least the reduced connectivity information.

2. The computer implemented method of claim 1, further comprising:
grouping a plurality of circuit component designs of the circuit component designs into a single element based in part or in whole upon the multiple categories of the circuit component designs; and
partitioning the connectivity information for the at least the portion of the electronic design based in part or in whole upon the single element.

3. The computer implemented method of claim 1, wherein the target comprises only one or more sources or one or more destinations but not both the one or more sources and the one or more destinations.

4. The computer implemented method of claim 1, further comprising:
identifying a circuit component design from the circuit component designs; and
determining a category from the multiple categories for the circuit component design.

5. The computer implemented method of claim 4, further comprising:
determining whether or not the circuit component design is to be grouped into a single element with one or more other circuit component designs based in part or in whole upon classifying the one or more other circuit component designs.

6. The computer implemented method of claim 5, further comprising:
grouping the circuit component design and the one or more other circuit component designs into a single element; and
representing the single element as a graphical element in a data structure for the at least the portion of the electronic design.

7. The computer implemented method of claim 1, further comprising:
determining a data structure for the at least the portion of the electronic design by using at least the connectivity information, wherein the data structure comprises a connectivity graph comprising a source, a destination, and at least one segment associated or annotated with connection definition or one or more conditions for connectivity.

8. The computer implemented method of claim 1, further comprising:
traversing a second description of the electronic design;
determining whether or not the at least the portion of the second description of the electronic design has been modified;
identifying a revised portion of the at least the portion of the electronic design that has been modified;
extracting updated connectivity information for the revised portion;
combining the updated connectivity information with the connectivity information by replacing a part of the connectivity information with the updated connectivity information; and
presenting one or more differences between the revised portion and the at least the portion of the electronic design in a design structure of the electronic design or in a connectivity data structure.

9. The computer implemented method of claim 8, further comprising:
determining a data structure for at least the revised portion by using at least the updated connectivity information, wherein the data structure comprises a connectivity graph including a source, a destination, and at least one segment associated or annotated with a connection definition or one or more conditions for connectivity.

10. The computer implemented method of claim 1, further comprising:
identifying a threshold limit from a user for stopping or halting traversal of the at least the portion of the electronic design;
stopping or halting the traversal of the at least the portion of the electronic design when the threshold limit is reached; and
resuming or restarting the traversal of the at least the portion of the electronic design from a point in the at least the portion of the electronic design where the traversal is stopped or halted.

11. The computer implemented method of claim 10, further comprising:
determining a data structure for at least a part of the at least the portion of the electronic design based in part or in whole upon the threshold limit, wherein the data structure comprises a connectivity graph including a source, a destination, and at least one segment associated or annotated with a connection definition or one or more conditions for connectivity.

12. The computer implemented method of claim 1, further comprising:
identifying a customization criterion for configuring a connectivity data structure for the at least the portion of the electronic design; and
modifying a connectivity data structure based in part or in whole upon the customization criterion by suppressing, hiding, or de-emphasizing at least one category of the multiple categories or at least one circuit component design from the connectivity data structure.

13. The computer implemented method of claim 12, further comprising:
representing the connectivity data structure after modifications in a connectivity graph based in part or in whole upon the customization criterion, wherein the connectivity graph includes a source, a destination, and at least one segment associated or annotated with a connection definition, one or more conditions for connectivity, or one or more combinations thereof.

14. The computer implemented method of claim 1, further comprising:
identifying one or more properties for verification based in part or in whole upon the connectivity information;
performing the verification by proving or disproving the one or more properties;
identifying a segment in a connectivity data structure, the segment associated with a failure in the verification of a property of the one or more properties; and
performing fixing for the failure by revising the at least the portion of the electronic design into a revised portion.

15. The computer implemented method of claim 14, further comprising:
determining a data structure for at least a part of the at least the portion of the electronic design based in part or in whole upon results of the verification and/or results of the fixing for the failure, wherein the data structure comprises a connectivity graph including a source, a destination, and at least one segment associated or annotated with a connection definition, one or more conditions for connectivity, the failure, the fixing, or one or more combinations thereof.

16. The computer implemented method of claim 14, further comprising:
performing the verification for the property against the revised portion;
re-extracting updated connectivity information for at least the revised portion;
updating the property into an updated property based in part or in whole upon the updated connectivity; and
performing the verification for the updated property.

17. The computer implemented method of claim 16, further comprising:
   determining a data structure for at least a part of the at least the portion of the electronic design based in part or in whole upon the updated connectivity information, wherein the data structure comprises a connectivity graph including a source, a destination, and at least one segment associated or annotated with a connection definition, one or more conditions for connectivity, information about the updated property, or one or more combinations thereof.

18. The computer implemented method of claim 1, further comprising:
   identifying a connectivity data structure for the at least the portion of the electronic design, the connectivity data structure comprising a connectivity graph;
   identifying a first node and a second node in the connectivity data structure;
   identifying a segment representing complex logic in the connectivity data structure between the first node and the second node; and
   generating a path property from the first node to the second node.

19. The computer implemented method of claim 18, further comprising:
   determining a counter-example showing that a first signal value at the first node and a second signal value at the second node are different;
   determining one or more conditions which, when exercised, cause the counter-example to occur; and
   generating one or more connectivity conditions by negating the one or more conditions.

20. A system for implementing an electronic design with automatic extraction of connectivity information, comprising:
   one or more mechanisms, at least one of which comprises at least one microprocessor including one or more processor cores executing one or more threads in a computing system;
   a non-transitory computer accessible storage medium storing thereupon program code that includes a sequence of instructions that, when executed by the at least one micro-processor or processor core of a computing system, causes the at least one micro-processor or processor core at least to:
   traverse at least a portion of an electronic design from a target;
   classify circuit component designs encountered during traversal into multiple categories that comprise at least one divergent node or at least one convergent node based in part or in whole upon one or more criteria;
   extract connectivity information from at least the multiple categories for the at least the portion of the electronic design based in part or in whole upon the one or more criteria;
   reduce the connectivity information into reduced connectivity information with one or more intermediate points along one or more paths in the electronic design; and
   implement a physical electronic design for the electronic design at least by devising at least the portion of the electronic design with at least the reduced connectivity information.

21. The system of claim 20, wherein the program code includes further instructions that, when executed by the at least one micro-processor or processor core, cause the at least one processor or processor core to:
   identify a circuit component design from the circuit component designs;
   determine a category from the multiple categories for the circuit component design; and
   determine whether or not the circuit component design includes a non-trivial circuit component design.

22. The system of claim 21, wherein the program code includes further instructions that, when executed by the at least one micro-processor or processor core, cause the at least one processor or processor core to:
   determine whether or not the circuit component design is to be grouped into a single element with one or more other circuit component designs based in part or in whole upon classifying the one or more other circuit component designs;
   group the circuit component design and the one or more other circuit component designs into a single element; and
   represent the single element as a graphical element in a data structure for the at least the portion of the electronic design.

23. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing coplanar waveguide transmission lines in an electronic design, the set of acts comprising:
   traversing at least a portion of an electronic design from a target;
   classifying circuit component designs encountered during traversal into multiple categories that comprise at least one divergent node or at least one convergent node based in part or in whole upon one or more criteria;
   extracting connectivity information from at least the multiple categories for the at least the portion of the electronic design based in part or in whole upon the one or more criteria;
   reducing the connectivity information into reduced connectivity information with one or more intermediate points along one or more paths in the electronic design; and
   implementing a physical electronic design for the electronic design at least by devising at least the portion of the electronic design with at least the reduced connectivity information.

24. The article of manufacture of claim 23, the set of acts further comprising:
   determining a data structure for the at least the portion of the electronic design by using at least the connectivity information, wherein the data structure comprises a connectivity graph comprising a source, a destination, and at least one segment associated or annotated with connection definition or one or more conditions for connectivity.

25. The article of manufacture of claim 23, the set of acts further comprising:
   identifying a connectivity data structure for the at least the portion of the electronic design, the connectivity data structure comprising a connectivity graph;
   identifying a first node and a second node in the connectivity data structure;
   identifying a segment representing complex logic in the connectivity data structure between the first node and the second node; and generating a path property from the first node to the second node.

26. The article of manufacture of claim 25, the set of acts further comprising:
   determining a counter-example showing that a first signal value at the first node and a second signal value at the second node are different;
   determining one or more conditions which, when exercised, cause the counter-example to occur; and
   generating one or more connectivity conditions by negating the one or more conditions.

* * * * *